E. C. GALLOWAY.
FERTILIZER DISTRIBUTER.
APPLICATION FILED NOV. 9, 1908.
940,455.
Patented Nov. 16, 1909.
2 SHEETS—SHEET 1.
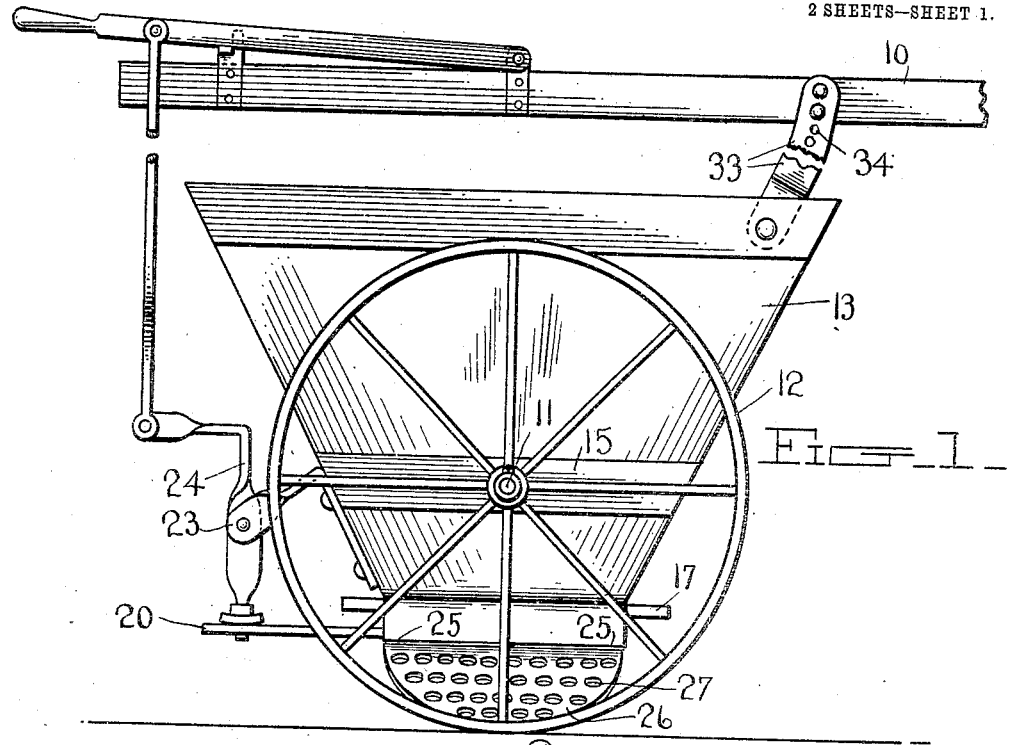
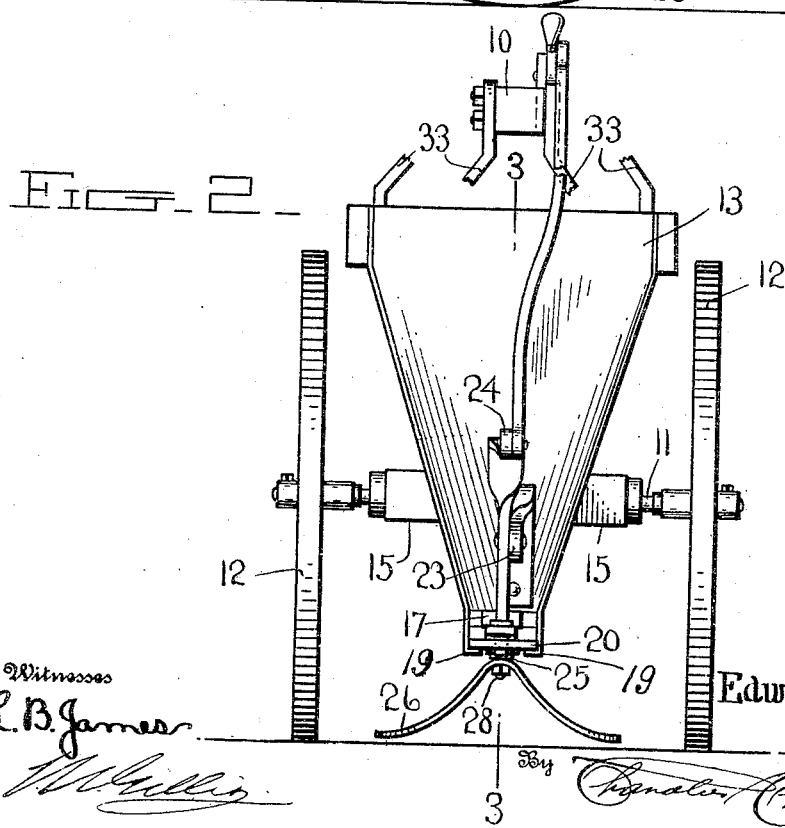
Witnesses
L. B. James
Inventor
Edward C. Galloway
By
Attorneys

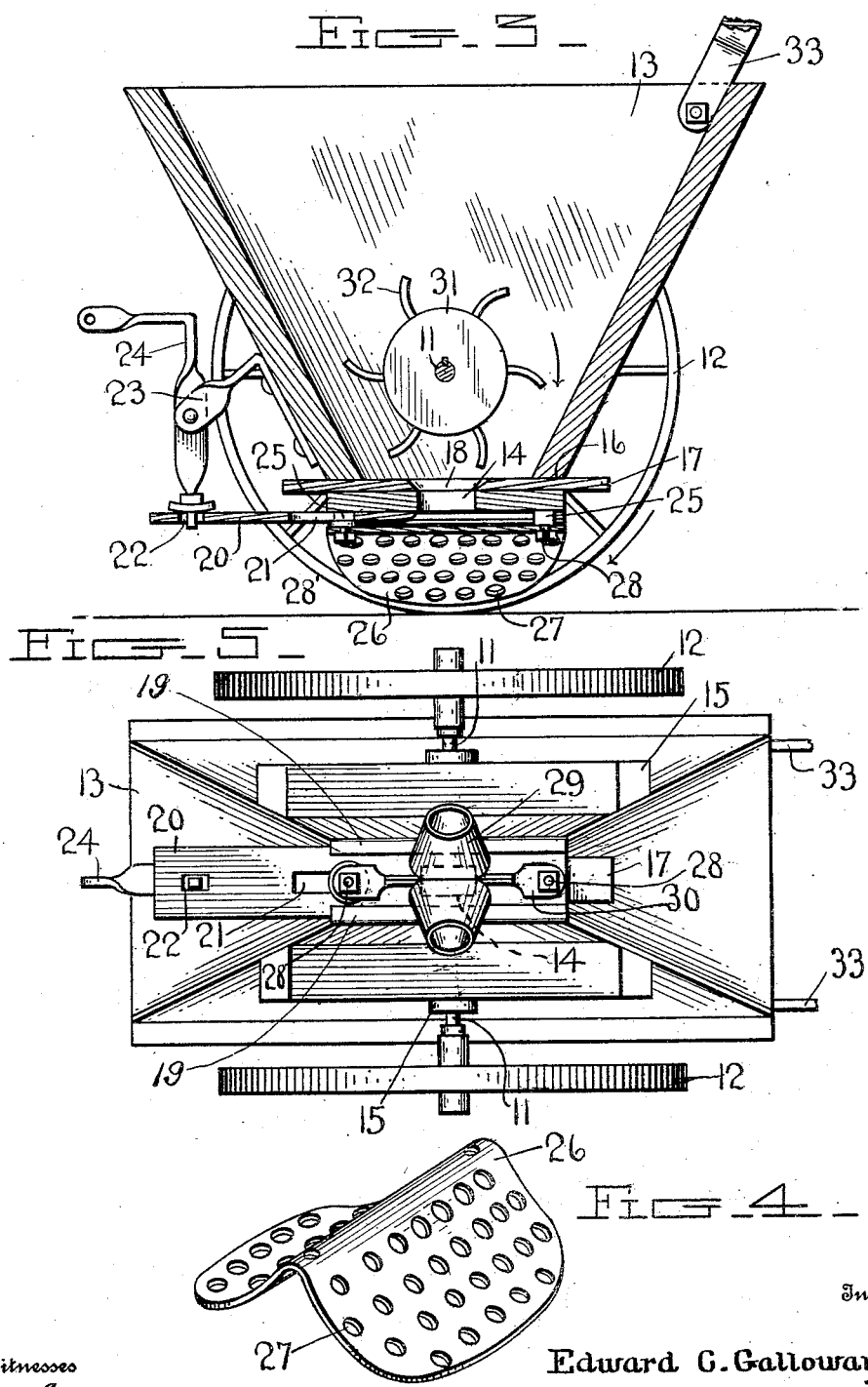

UNITED STATES PATENT OFFICE.

EDWARD C. GALLOWAY, OF BUTLERVILLE, ARKANSAS.

FERTILIZER-DISTRIBUTER.

940,455.

Specification of Letters Patent. Patented Nov. 16, 1909.

Application filed November 9, 1908. Serial No. 461,777.

*To all whom it may concern:*

Be it known that I, EDWARD C. GALLOWAY, a citizen of the United States, residing at Butlerville, in the county of Lonoke, State of Arkansas, have invented certain new and useful Improvements in Fertilizer-Distributers; and I do hereby declare the following to be a full, clear, and exact description of the invention, such as will enable others skilled in the art to which it appertains to make and use the same.

This invention relates to farming implements and has special reference to a fertilizer distributer arranged to be attached to any kind of a cultivator.

One object of the invention is to improve the general construction of such a fertilizer distributer.

Another object of the invention is to improve the construction of the feeding wheels in a distributer of this character.

A still further object of the invention is to provide an improved form of distributer plate for devices of this character.

With the above and other objects in view, the invention consists, in general, of a hopper provided with a novel form of feed wheel or agitator and a novel form of distributer plate held beneath the hopper.

The invention further consists in certain novel details of construction and combinations of parts hereinafter fully set forth, illustrated in the accompanying drawings, and specifically claimed.

In the accompanying drawings, like characters of reference indicate like parts in the several views, and:—Figure 1 is a side elevation of a fertilizer distributer constructed in accordance with this invention. Fig. 2 is a rear elevation of such a distributer. Fig. 3 is a section on the line 3—3 of Fig. 2. Fig. 4 is a perspective view of the distributer plate. Fig. 5 is a bottom view with the distributer plate removed and a pair of distributing tubes substituted.

In Figs. 1 and 2 there is shown a beam 10 which represents a portion of a cultivator or the like. This has been done in order to show the manner of attaching the device. The numeral 11 indicates an axle whereon is mounted a pair of wheels 12. The body of the distributer consists of a hopper 13, preferably having its end walls of wood and the side walls of zinc or galvanized iron. This hopper is inverted frusto-pyramidal in shape so that an opening 14 is left in the bottom. This opening 14 forms the delivery opening. Bearings 15 are formed upon the sides of the hopper and through these bearings passes the axle 11. It will be noted that the delivery opening is in the form of an elongated slot. Slidably mounted in openings 16 formed in the end walls of the hopper is a regulator plate 17 provided with a slot 18.

Below the regulator plate, the sides of the hopper are provided with guides 19 where is mounted a cut-off plate 20 provided with a slot 21. This cut-off plate is further provided with an opening 22 near the rear end thereof. Projecting from the rear wall of the hopper is an arm 23 whereon is mounted a bent lever 24 one end of which is held in the opening 22 of the cut-off plate, while the other end projects rearwardly. By this arrangement the cut-off plate may be positioned so as to extend over the opening in the bottom of the hopper, or be drawn back so as to leave the same open.

Lugs 25 are formed on the bottom of the hopper, one of which is positioned within the slot 21 of the cut-off plate and serves to limit the motion of said plate. Attached to these lugs 25 is a distributer plate 26. This distributer plate is preferably made of thin sheet metal and consists of two anticlinally arranged halves each provided with a multiplicity of perforations 27. The distributer plate 26 is held to the lugs 25 by means of suitable bolts 28 so that it may be removed when desired. There is also provided with this device a pair of distributer tubes 29 which may be positioned in the place of the plate, said tubes being provided with a perforated supporting bar 30 for this purpose.

Within the hopper and mounted on the axle 11 is an agitator or delivery wheel 31 provided with a plurality of curved fingers 32. These curved fingers are so shaped that the ends are substantially parallel to the bottom of the hopper when the finger is in its lowest position. By means of this construction, the fertilizer in the hopper is pushed through the delivery opening by the fingers as well as agitated in the usual manner.

In order to attach the machine to a vehicle, there is provided at the front upper edge of the hopper, a pair of arms 33 having suitable bolt holes 34 in their free ends.

In the operation of the device the same, having been attached to a cultivator or the like, the hopper is filled with the fertilizer. As the cultivator is moved forward the lever 24 is actuated by the operator to draw out the cut-off plate and open the lower part of the distributer hopper. The regulator plate is then adjusted to get the proper feed of the fertilizer. As the machine moves over the ground, the wheels 12 rotate the axle 11 and carry therewith the feed wheel 31. This, as before noted, operates to agitate the fertilizer and break the same up and at the same time the curved form of the arms with their peculiarly formed ends forces the fertilizer positively out through the opening. As the fertilizer falls through the opening it strikes the distributer plate 26. The shape of this plate is such that the fertilizer is equally distributed on both sides of the device and is thoroughly scattered by means of the openings therethrough. The plate thus offers a great improvement over the ordinary type of distributer plates in which the slope is all in one direction.

It is to be noted that when this fertilizer distributer is made in large form the same may be provided with a suitable tongue or shaft for attachment to a draft animal.

By means of the attachment indicated at 29 the fertilizer may also be distributed in two even rows on either side of the plants desired to be fertilized. It has been found, however, that much better results are obtained with the use of the special form of distributer plate above described.

It is to be noted that with the arrangement of delivery wheel and distributer plate specific to this invention the two act together in a manner to secure greatly improved results. When the fertilizer is forced through the opening by the peculiar action of this delivery wheel it is apt to become compacted and form a series of little masses. With the form of distributer plate herein used these masses strike the angle of the plate and are broken up for complete distribution.

It is obvious that minor changes may be made in the form and construction of this invention without departing from the material principles thereof. It is not therefore desired to confine the invention to the exact form herein described, but it is wished to include all such as properly come within the scope thereof.

Having thus described the invention, what is claimed as new, is:—

1. In a fertilizer distributer, a distributer plate having two anticlinally arranged outwardly curved halves each provided with a multiplicity of perforations.

2. In a fertilizer distributer, a hopper having a feed opening in the bottom, an axle extending through the hopper, wheels mounted on said axle, means to positively force fertilizer through the opening in the hopper, and a distributer plate having two anticlinally arranged halves each provided with a multiplicity of perforations held with its angle below and in alinement with said opening.

3. In a fertilizer distributer, a hopper having a feed opening in the bottom, means to vary the size of said opening, an axle extending through the hopper, wheels mounted on said axle, an element to positively force fertilizer through the opening in the hopper, and a distributer plate having two anticlinally arranged halves each provided with a multiplicity of perforations held beneath the hopper with its angle in alinement with said opening.

4. In a fertilizer distributer, a hopper having a feed opening in the bottom thereof, means to vary the size of the opening in the hopper, other means to close said opening, an axle extending through said hopper, wheels mounted on said axle, an element to positively force fertilizer through the opening in the hopper, and a distributer plate having two anticlinally arranged halves each provided with a multiplicity of perforations held below said hopper with its angle in alinement with the opening of the hopper.

5. In a fertilizer distributer, a hopper having an opening in the bottom, an axle extending through said hopper, wheels mounted on said axle, a delivery wheel on said axle provided with a series of arms curved in the direction of rotation of the wheel and having ends arranged to force the contents of the hopper through the opening, and a distributer plate having two anticlinally arranged halves each provided with a multiplicity of perforations held below said hopper with the angle of the plate in alinement with the opening.

6. In a fertilizer distributer, a hopper having a feed opening in the bottom, means to vary the size of the opening in the hopper, other means to close said opening, an axle extending through the hopper, wheels fixedly mounted on the axle, a delivery wheel fixedly mounted on said axle and provided with a series of arms curved in the direction of rotation of the wheel, said arms having ends arranged to force the contents of the hopper through the openings, and a distributer plate having two anticlinally arranged halves each provided with a multiplicity of perforations, said distributer plate being removably mounted below the hopper and having its angle in alinement with the opening in the bottom of said hopper.

In testimony whereof, I affix my signature, in presence of two witnesses.

EDWARD C. GALLOWAY.

Witnesses:
A. B. GOODRUM,
R. P. BAIN.